United States Patent [19]
Lewandowski et al.

[11] Patent Number: 5,818,874
[45] Date of Patent: Oct. 6, 1998

[54] TRANSFORMERLESS DATA TRANSMISSION LINE DRIVER

[75] Inventors: Ted Lewandowski, Arnprior; Manfred Ficker, Kanata, both of Canada

[73] Assignee: Northern Telecom Limited, Montreal, Canada

[21] Appl. No.: 792,861

[22] Filed: Jan. 31, 1997

[51] Int. Cl.$^6$ .................................................. H04L 25/02
[52] U.S. Cl. .......................................... 375/257; 345/295
[58] Field of Search ..................................... 375/257, 259, 375/295, 289; 327/107, 108; 370/257, 295

[56] References Cited

U.S. PATENT DOCUMENTS

| | | | |
|---|---|---|---|
| 4,437,021 | 3/1984 | Sumi et al. ............................. | 375/257 |
| 4,775,984 | 10/1988 | Jaffre et al. ............................. | 375/257 |
| 4,964,141 | 10/1990 | Matsushima et al. .................. | 375/257 |
| 5,519,731 | 5/1996 | Cioffo .................................... | 375/260 |
| 5,579,336 | 11/1996 | Fitzgerald et al. ..................... | 375/257 |

*Primary Examiner*—Tesfaldet Bocure
*Attorney, Agent, or Firm*—Thomas R. Vigil; Achmed Sadik

[57] ABSTRACT

A line driver circuit uses a ROM to store coefficients corresponding to incoming data pulses and converts the coefficients in a digital-to-analog converter to the desired pulse (signal) shape, which drives a current-mirror for applying high level bipolar signals to the transmission line.

6 Claims, 1 Drawing Sheet

TRANSFORMERLESS DATA TRANSMISSION LINE DRIVER

BACKGROUND OF THE INVENTION

1. Field of the Invention

The present invention relates to data transmission in general, and in particular to line drivers for data transmission lines. More particularly still, it relates to a transformerless line driver circuit for high-speed data transmission lines.

2. Prior Art

In data transmission systems such as DS3 and STS, it is known to impart the bipolar positive and negative going data pulses to a data transmission line, say a 75 Ohm coaxial cable or the like, by means of a transformer followed by an analog pulse-shaper circuit in order to meet the requisite "pulse mask template" specified for the output waveform of the transmission system.

SUMMARY OF THE INVENTION

The present invention dispenses with transformers, as well as analog pulse-shaping circuits, in data transmission line drivers.

A line driver circuit comprises: digital means for storing a plurality of coefficients corresponding to a data pulse; a digital-to-analog converter (D/A) for sequentially converting the coefficients to an analog signal (pulse); and solid-state output means for imparting the analog signal to a transmission line, without magnetic transformer between the output means and the transmission line.

An advantage of the present line driver circuit is that it replaces (generally undesirable) line transformers and analog pulse shapers with a read-only memory (ROM), a D/A converter, and a transistor current mirror output stage.

Several pluralities of coefficients, corresponding to different pulse mask templates, may be stored in the ROM. The appropriate plurality is then selected by means of two-bit address selection to accommodate, for example, any one of the DS-3 HIGH, STS-1 HIGH, DSX-3 or STSX-1 data transmission systems. Needless to say, other data systems may be accommodated by expanding the ROM of the present preferred embodiment, or by programming it differently.

BRIEF DESCRIPTION OF THE DRAWINGS

The preferred embodiment of the present invention will now be described in conjunction with the annexed drawing figures, in which.

DETAILED DESCRIPTION OF THE PREFERRED EMBODIMENTS

Figure 1:
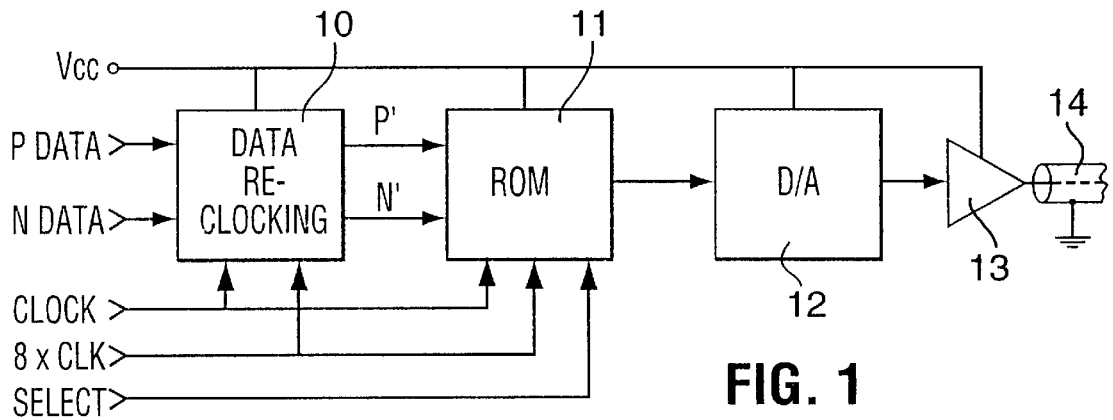
FIG. 1 is a high-level block schematic of a line driver circuit according to the present invention.

Referring now to FIG. 1 of the drawings, the line driver circuit comprises the data reclocking (DR) circuit 10, which receives the separate PDATA and NDATA pulses and the system clock CLOCK (nominally 44.736 MHz in DS3 and 51.84 MHz in STS-1). The DR10 outputs positive P' and negative N' data pulses, which correspond to PDATA and NDATA except that they are synchronous to CLOCK, which is derived from an 8XCLK (a clock at eight-times the rate of CLOCK); this causes P' and N' to be aligned with the CLOCK. The P' and N' pulses, as well as the CLOCK and the 8XCLK, address an appropriate section of a ROM 11, which is also addressed by a SELECT signal which depends on the type of data transmission system the line driver of FIG. 1 is driving. The select signal, which in this embodiment is a two-bit word giving one-of-four choices, selects that part of the ROM 11 which has the coefficients for one of four systems stored in it. The coefficients (eight in one CLOCK period) when retrieved in sequence and applied to a digital-to-analog converter (D/A) 12 in sequence produce at its output an analog waveform corresponding to the $P^1$ or $N^1$ pulse, as the case may be, which meets the pulse mask template specified for the particular transmission system in question. The output of the D/A 12 is applied to a solid-state line driver stage proper which drives a transmission line 14, shown as in coaxial cable.

Figure 2:
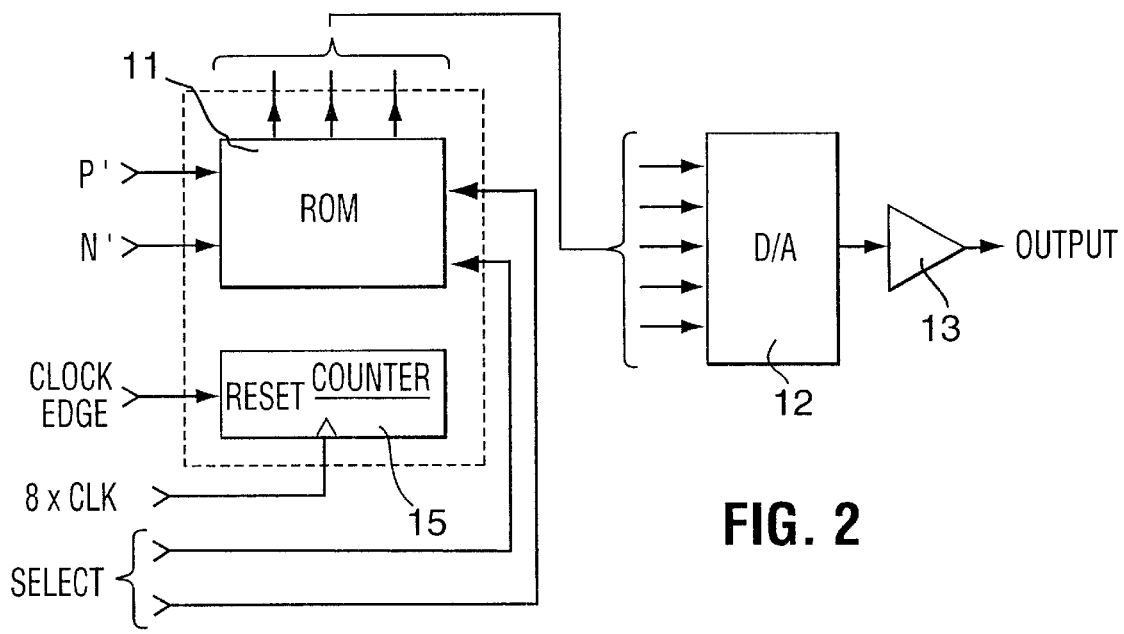
FIG. 2 shows a realization of the ROM block in FIG. 1 in more detail.

Turning to FIG. 2, it shows details of how the ROM 11 is read by means of P' and N' leads, the SELECT code of two bits (four choices) and a three-stage counter 15 clocked by 8XCLK at eight-times the CLOCK rate of the data. Accordingly, each data pulse (whether P or N) is reconstructed from eight samples PCM encoded and stored in the ROM in eight-times-six-bit words (plus a sign bit), giving for each sample a $2^6=64$ levels of quantization. The six-bit words are read-out of the ROM 11 by means of the counter 15 and into the D/A 12 one word after another in sequence, so that these output of the D/A 12 is an analog pulse corresponding to the requisite pulse mask template specified for the data system in question. The output of the D/A 12 drives the last stage of the circuit, which is the line driver 13 proper.

Figure 3:
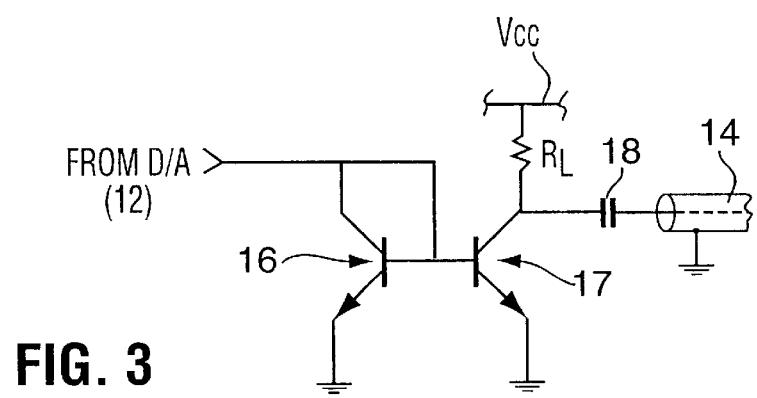
FIG. 3 shows a detailed realization of the output stage shown in FIGS. 1 and 2.

The line driver 13 is shown in FIG. 3 and comprises two NPN transistors 16 and 17 (for a $V_{CC}$ of +5 V) interconnected to provide a high ratio current-mirror (of course, other current-mirror circuits may be used), where the collector of the transistor 17 (a current source) is connected to the $V_{CC}$ rail through a load resistor $R_L$ valued to provide a match to the input impedance of the transmission line 14, in the present system, $R_L$ is 75 Ohms. In order to isolate the transmission line from the dc-level at the collector of the transistor 17 a coupling capacitor 18 is used. The high ratio current mirror circuit shown in FIG. 3 provides up to 2 Volt peak-to-peak signal swing from a power supply of only +5 V.

What is claimed is:

1. A line driver circuit comprises: digital means for storing a plurality of coefficients corresponding to a data pulse; a digital-to-analog converter (D/A) for sequentially converting the coefficients to an analog signal (pulse); and solid-state output means for imparting the analog signal to a transmission line, without magnetic transformer between the output means and the transmission line.

2. The line driver circuit as defined in claim 1, said analog signal being a high level bipolar signal.

3. The line driver circuit as defined in claim 1, said solid-state output means being a current-mirror circuit.

4. The line driver circuit as defined in claim 2, said solid-state output means being a current-mirror circuit.

5. The line driver circuit as defined in claim 4, said high level bipolar signal corresponding to two data pulses.

6. The line driver circuit as defined in claim 5, said high level bipolar signal having a peak-to-peak value approaching 40% of power supply voltage powering said line driver circuit.

* * * * *